(12) United States Patent
Winer et al.

(10) Patent No.: US 8,109,205 B1
(45) Date of Patent: Feb. 7, 2012

(54) VERTICAL GRILLING APPARATUS

(75) Inventors: Todd Winer, Bridgewater, MA (US);
Kathy Sidell Trustman, Brookline, MA (US)

(73) Assignee: Met Club Manager, LLC, Chestnut Hill, MA (US)

( * ) Notice: Subject to any disclaimer, the term of this patent is extended or adjusted under 35 U.S.C. 154(b) by 976 days.

(21) Appl. No.: 12/014,548

(22) Filed: Jan. 15, 2008

(51) Int. Cl.
*A23L 3/00* (2006.01)

(52) U.S. Cl. .......................................................... 99/359

(58) Field of Classification Search .................... 99/389, 99/390, 391, 392, 393, 399, 359, 367, 386, 99/387, 400, 444, 446; 219/385, 388, 394, 219/392, 393; 126/39 R; 432/9, 225, 230–232
See application file for complete search history.

(56) References Cited

U.S. PATENT DOCUMENTS

| | | | | |
|---|---|---|---|---|
| 1,901,603 A | * | 3/1933 | Juengst et al. | 99/335 |
| 2,720,827 A | * | 10/1955 | Del Francia | 99/444 |
| 3,103,160 A | * | 9/1963 | Forniti et al. | 99/339 |
| 4,619,190 A | * | 10/1986 | Smith | 99/393 |
| 4,647,758 A | * | 3/1987 | Kelian | 219/385 |
| 5,590,584 A | * | 1/1997 | Ahn | 99/327 |
| 5,853,781 A | * | 12/1998 | Bono et al. | 426/110 |
| 6,041,773 A | * | 3/2000 | Rosenquist | 126/275 R |
| 6,639,187 B2 | * | 10/2003 | Arel et al. | 219/388 |
| 6,827,005 B2 | * | 12/2004 | Babacan | 99/326 |
| 7,762,636 B2 | * | 7/2010 | Veeser et al. | 312/330.1 |
| 7,921,767 B2 | * | 4/2011 | Cook et al. | 99/328 |
| 2004/0020915 A1 | * | 2/2004 | Shei | 219/385 |
| 2007/0157823 A1 | * | 7/2007 | Cohen et al. | 99/372 |

* cited by examiner

*Primary Examiner* — Duc Nguyen
*Assistant Examiner* — Mark Woodall
(74) *Attorney, Agent, or Firm* — Chapin IP Law, LLC; Barry W. Chapin, Esq.

(57) ABSTRACT

A vertical grilling apparatus employs food cartridges on rails to slideably insert the food cartridge into the housing of the grilling apparatus between two thermal elements for cooking the food items. The rails correspond to a vertical slot, or opening, in the housing for engaging the food cartridge. The food cartridge is sized to correspond to a top and bottom rail and to the vertical slot. The food cartridges have hinged sides which close or clamp to an opposed position for engaging and securing the food items in a food specific insert on the hinged sides sized to accommodate the food item. The horizontally disposed food cartridge is rotated to a vertical orientation after closing and securing the food items for insertion into the vertical slot. The insertion disposes the food cartridge equidistant between the opposed thermal elements for thermal communication with the thermal elements for cooking the food.

13 Claims, 9 Drawing Sheets

VERTICAL GRILLING APPARATUS

BACKGROUND

In conventional food preparation and cooking environments, a cooking apparatus or system such as a stove, oven or grill can employ a variety of heat sources to cook food. In general, such cooking systems can utilize various configurations of heat sources to apply thermal energy (heat) to food items via convection, radiant, and/or conductive heat transfer mediums. During the food preparation process, conventional cooking systems operate to heat food items for a predetermined amount of time to modify the texture and appearance of the food, to make the food more palatable and to eliminate impurities in the food items. In a restaurant or commercial food service environment, food preparation equipment such as grilling systems are often employed to cook foods such as meats, fish and poultry. Such food preparation equipment generally provides a higher volume of cooking output than conventional home cooking appliances. In a restaurant environment, cooking appliances may be expected to quickly cook large quantities of food for discriminating diners. Accordingly, conventional food preparation equipment is designed to deliver the proper amount of heat in a relatively short time so as to enable efficient diner turnaround. Further, the heat delivery in conventional cooking systems attempts to avoid uneven or extreme heat delivery that can cook food unevenly. Finally, conventional food preparation equipment typically consumes electrical, gas and/or petroleum utilities, and given the high volume of cooking output, unutilized or misdirected heat generation inefficiently consumes these resources.

SUMMARY

Conventional coking devices, and in particular, conventional grilling systems for grilling meats or other food items suffer from a variety of deficiencies. In particular, conventional grilling systems that cook meats provide for horizontal grilling surfaces upon which the meat or other food to be cooked is placed during the cooking process. A flame or other heat source disposed underneath grilling surface cooks one side of the meat at a time and requires to chef or operator to flip the meat onto different sides to cook the food evenly. Accordingly, due to the horizontal nature of the grill and horizontal cooking approach for meats or other foods, conventional grilling systems require substantial cooking time and heat energy and such systems require large cooking areas and floor space. In a food preparation environment, floor space is at a premium, and conventional horizontal cooking appliances are subject to selectivity in competing for available floor space. Additionally, in conventional horizontal cooking systems such as gas grills, the rising heat is lost after passing above the grill surface. Further, conventional grills cook only one side of the food item at a time, requiring flipping the food item and time monitoring amounts of time the food is cooked on each side to ensure consistent grilling of the food item. Finally, as food drippings emanate from the cooking food item during grilling, care must be taken to ensure that the food item does not become excessively dry as juices from meat, for example, fall down below the meat being cooked on a conventional horizontal cooking grill.

Configurations herein provide for a vertical grilling system and apparatus and are based, in part, on the observation that a vertical orientation of grilled food items decreases the horizontal area required for a particular grilling area, and mitigates the additional grilling area needed for multiple food items, as the vertical orientation "stacks" the food items upwards rather than outwards over the horizontal grill. Accordingly, configurations herein substantially overcome the shortcomings of conventional grilling arrangements by providing a vertical grilling apparatus for orienting food items in a vertical manner between two heating elements (thermal elements). A food cartridge, or rack, contains the food items in a secure manner by two sides hinged together to close around the food items, encasing the food items in a vertical unit clamped together by a handle attached to each of the sides and adapted for insertion through a vertical slot into a housing of the vertical grilling apparatus. The food cartridge is disposed between two thermal elements to cook both sides simultaneously, while allowing emanating cooking juices to trickle down over lower food items in the vertical orientation, maintaining moisture in the food items but allowing the cooking juices to drip away.

The vertical grilling apparatus employs a food cartridge which is slideably inserted onto rails in the housing of the grilling apparatus between two thermal elements for cooking the food items. The rails correspond to a vertical slot, or opening, in the housing for engaging the food cartridge. The food cartridge is sized to correspond to a top and bottom rail and to the vertical slot. The food cartridges have hinged sides which close or clamp to an opposed position for engaging and securing the food items in a food specific insert on the hinged sides sized to accommodate the food item. The horizontally disposed food cartridge is rotated to a vertical orientation after closing and securing the food items for insertion into the vertical slot. The insertion disposes the food cartridge equidistant between the opposed thermal elements for thermal communication with the thermal elements for cooking the food.

The housing disposes multiple pairs of rails, each including a top member and a bottom member, in a collinear vertical alignment with each slot for receiving multiple food cartridges via the same vertical slot. Each of the food cartridges has a size, or height, corresponding to the distance between the top and bottom members of the rail pairs it is to engage. Therefore, the pairs of vertical rails dispose multiple food cartridges in the same thermal path defined by the vertical orientation of the rails such that each of the food cartridges is in the same heating current, which rises upwards between the thermal elements. The heating current rises up through a vent opening in the top of the housing to provide thermal communication with a finishing rack on top of the housing for further cooking or warming the food items by placing the food cartridge on the finishing rack. Further, the vertical orientation of the food cartridges is such that cooking fluids (drippings) emanating from the food items are deposited on lower food items below, for maintaining heat and moisture in the food items, and finally into a drip trap through a drip opening in the bottom of the housing.

In further detail, the disclosed vertical cooking apparatus includes a housing having a top, a bottom and at least one side, in which the housing defines a vertical slot, such that the vertical slot is receptive to a food cartridge operable to contain food items. The housing contains a first thermal element and a second thermal element, the first and second thermal elements disposed within the housing on opposed sides of the slot, and includes a plurality of rails aligned with the slot, in which the plurality of rails is aligned in a vertical orientation between the first thermal element and second thermal elements, such that each of the plurality of rails is operable to slidingly engage a correspondingly sized food cartridge. The apparatus also includes a finishing rack disposed above an opening in the top of the housing, in which the finishing rack is in thermal communication with the first and second heating elements, receiving the same heating current.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 7 is a perspective view of a food cartridge as in FIG. 6a;

DETAILED DESCRIPTION

The vertical grilling apparatus overcomes the shortcomings of conventional grilling arrangements by disposing the food items in a vertical manner between multiple thermal elements, and employs a system of food cartridges for inserting and removing the food items from the cooking area through a vertical slot, minimizing heat lost from opening the front. The following description discloses a particular configuration depicted herein and is not intended to limit alternate configurations.

Figure 1:
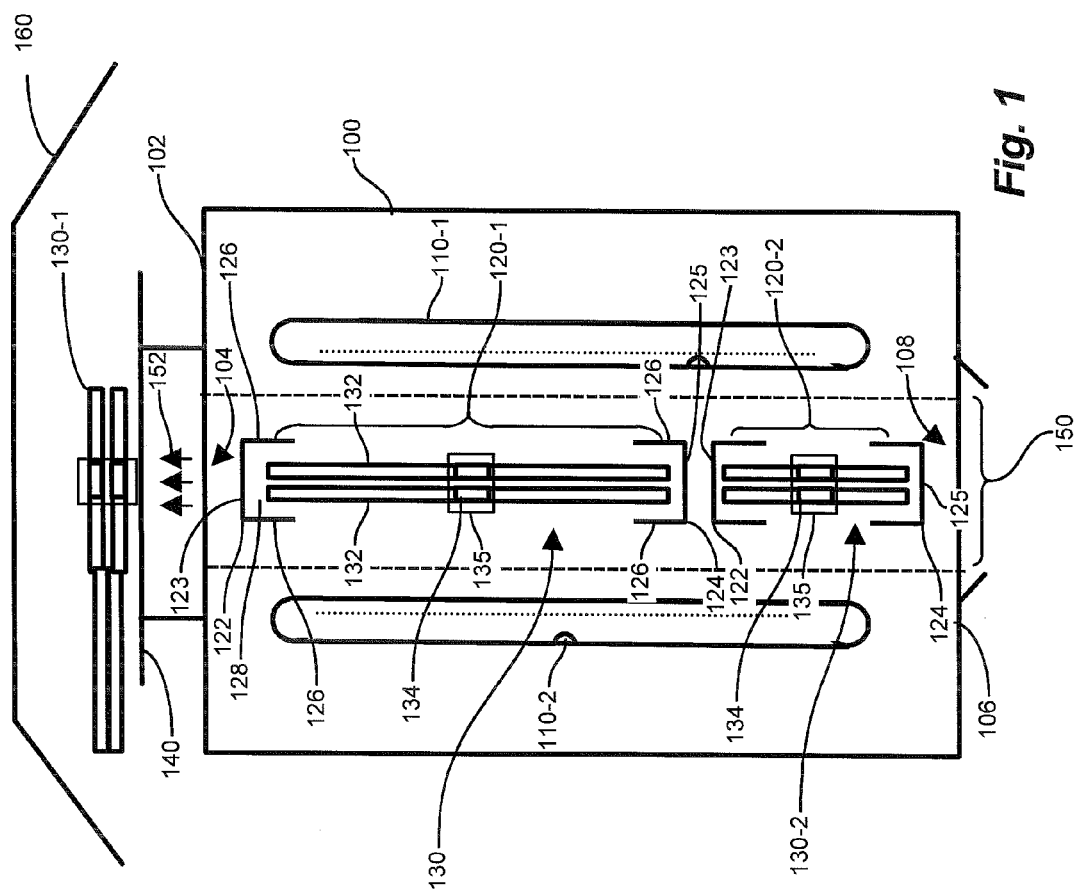
FIG. 1 is a front elevation view of the vertical grilling apparatus as disclosed herein.

FIG. 1 is a front elevation view of the vertical grilling apparatus as disclosed herein. Referring to FIG. 1, a housing 100 includes thermal elements 110-1, 110-2 (110 generally) flanking either side of rail pairs 120-1, 120-2 (120, generally). The thermal elements 110 may be gas, electric, or other suitable heat source, discussed further below in FIG. 9. Each of the rail pairs 120 has a top member 122 and a bottom member 124. The top member 122 includes a top surface 123 and side surfaces 126, and the bottom member 124 has a base surface 125 and side surfaces 126. The top 122 and bottom 124 members are adapted to slidingly engage a food cartridge 130 by sliding the food cartridge along the base surface 125 while the side surfaces 126 restrict lateral movement of the food cartridge 130 to maintain a frictional slide along the pair 120. Each food cartridge 130-1 . . . 130-n (130 generally) has opposed sides 132 connected to handles 134 for closing the opposed sides 132 around the food items and securing the food items via a clasp 135.

The housing 100 includes a finishing rack 140 disposed above an opening 104 in the housing 100. The opening 104 is disposed in a thermal path 150 defined by the thermal elements 110 for receiving a heating current 152 that provides thermal communication to a food cartridge 130-1 disposed on the finishing rack 140. Cooking fumes, such as steam and smoke, are expelled via a hood 160, and a door 162 (FIG. 2; omitted from FIG. 1 for clarity) retains heat within the housing 100 while allowing ventilation and observation via an insignia cutout. Cooking juices and liquids expelled from the food items during cooking are allowed to drip down the food cartridge 130 through a drip opening 108. The hood 160 or other suitable exhaust apparatus exhausts cooking fumes from the cooking area.

Figure 2:
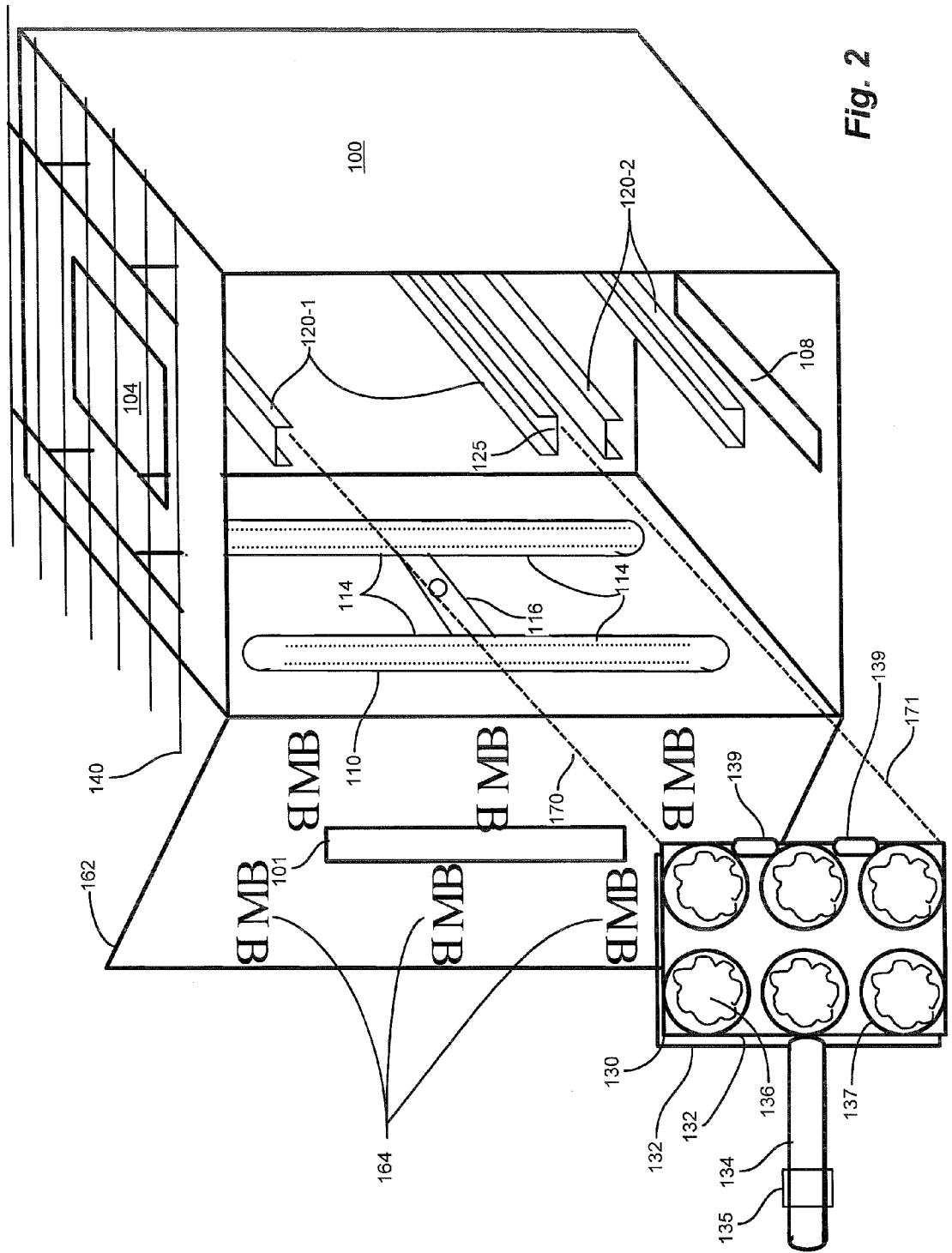
FIG. 2 is a perspective view of the vertical grilling apparatus of FIG. 1.

FIG. 2 shows a perspective view of the housing 100 of FIG. 1. Referring to FIGS. 1 and 2, in operation, the food cartridge 130 is populated with food items 136, such as ground beef patties, chicken breast, steak, sausage, or other suitable food item 136. The food cartridge 130 has food specific inserts 137, shown further below in FIGS. 6a-6b, adapted to the shape of particular food items 136. The opposed sides 132 clamp closed via the clasp 135 to frictionally secure the food items 136 between the clasped sides 132. The food cartridge 130 is inserted in a sliding manner along the rails pairs 120, sliding along the base surface 125 while held laterally by the side surfaces 126 and a tolerance gap 128 between the top surface 123. The rail pair 120 engages the food cartridge 130 between the thermal elements 110, which in the configuration shown are "H" shaped gas jet heating elements, however any suitable heating element may be employed. Such an "H" shaped element is a commonly fabricated element typically employed in gas cooking environments, and is thus readable maintainable and replaceable. About half way through cooking, the food cartridge 130 may be removed and rotated 180 degrees to reverse the orientation of the food items 136 (FIG. 2) from top to bottom and vice-versa. The thermal path 150 defined by the heating elements drives a heating current 152, which may be hotter at the top, thus reversing the orientation ensures even cooking of the food items 136. Subsequently, the food cartridge 130 is removed and may be placed on the finishing rack 140 to augment the doneness of the food items or to further warm the food prior to serving. Further, alternate configurations may dispose the thermal elements 110 at different distances in order to favor one particular side, depending on the nature of the food items 136 being cooked.

Continuing to refer to FIG. 2, the food cartridge 130 is shown in an insertion position (note that the door 162 is open for clarity; typically the food cartridge 130 is inserted through a slot 101 in the door 162). The food cartridge 130 engages one of the rail pairs 120 by sliding along the bottom surface 125 of the lower rail 124 and between the sides 126 of both the top rail 122 and the bottom rail 124, as shown by dotted lines 170, 171. Note that the housing 100 may also include other support brackets for the top and bottom rails 122, 124, omitted in this view for clarity. Following insertion along the rails 122, 124, the food cartridge 130 allows the food items 136 therewith to be cooked by the thermal elements 110.

Figure 3:
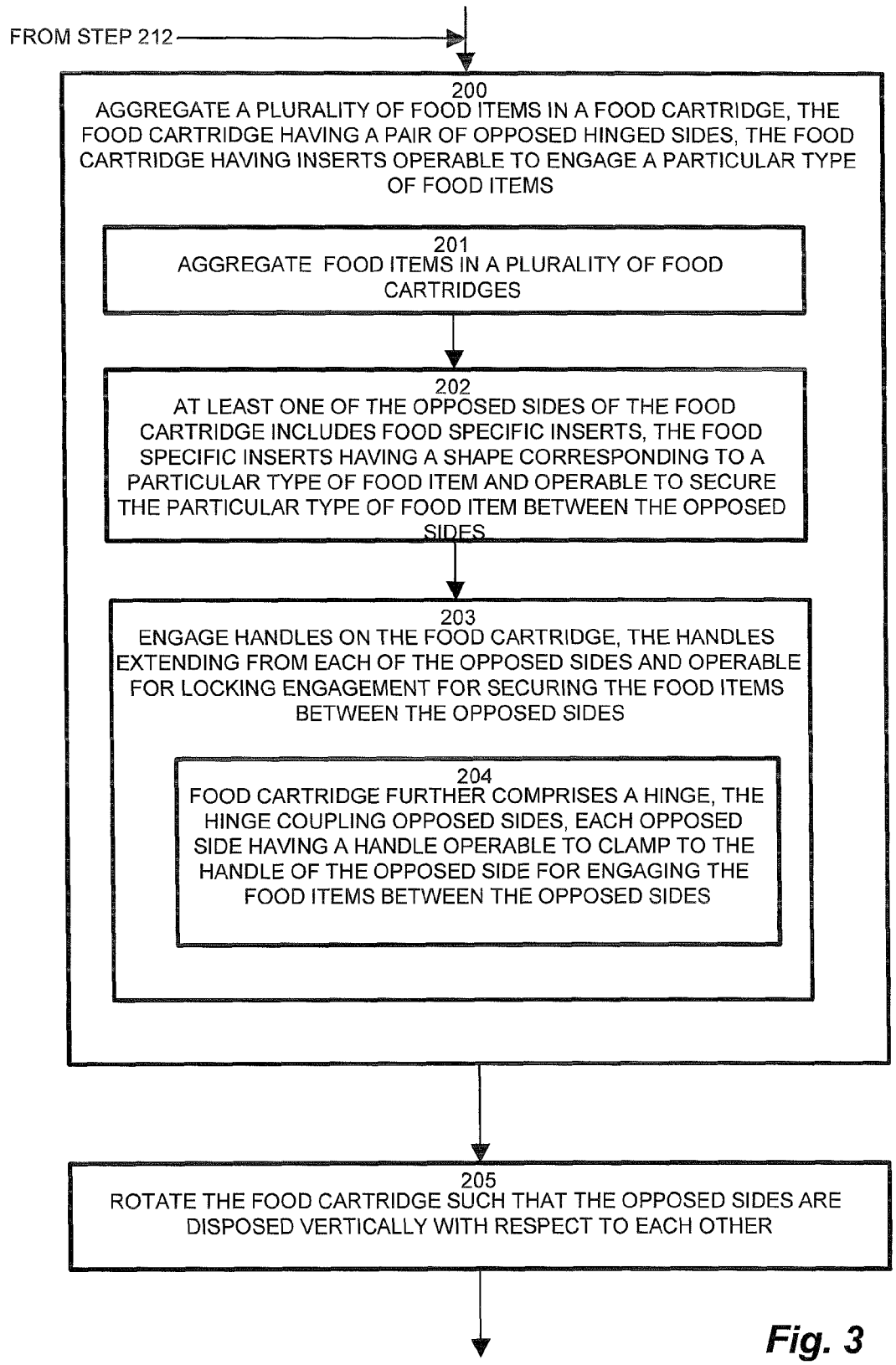
FIGS. 3-5 are a flowchart of cooking a food item using the vertical grilling apparatus.
Figure 4:
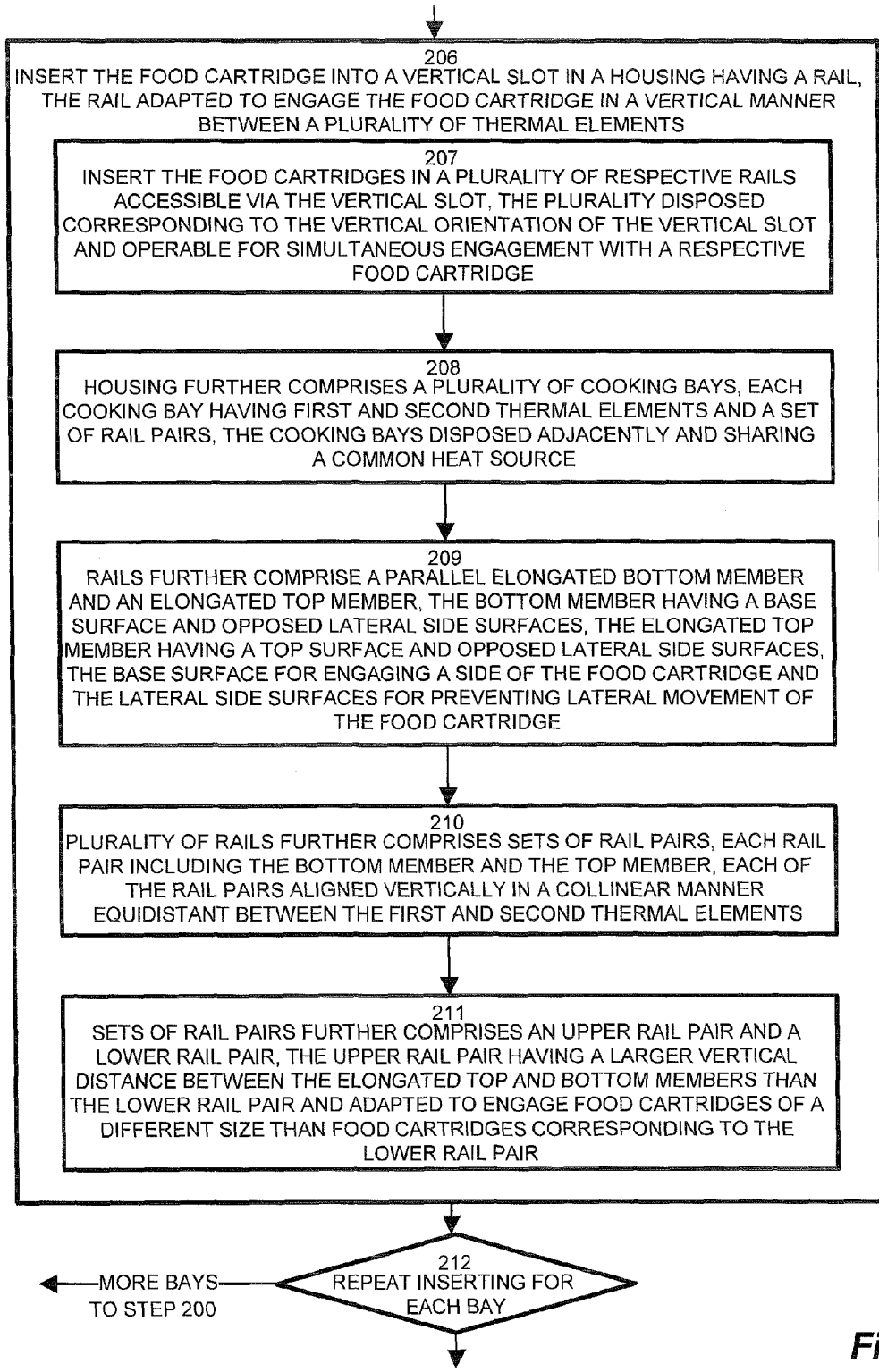
Figure 5:
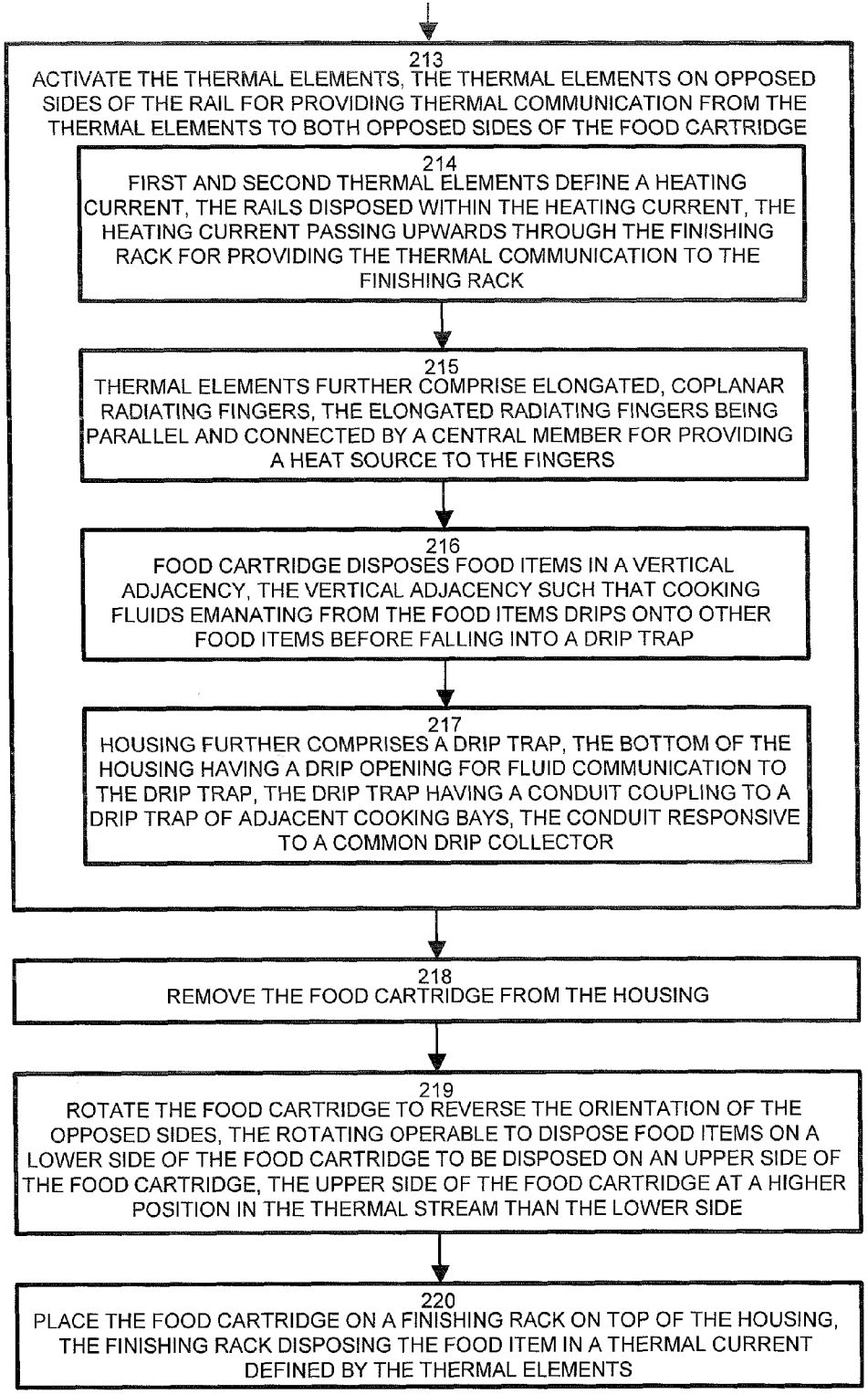

FIGS. 3-5 are a flowchart of cooking a food item using the vertical grilling apparatus. In the arrangement shown, an example method of employing the vertical grilling apparatus for efficiently cooking a large number of food items 136 is shown. Alternate configurations, such as smaller arrangements for non-commercial use, alternative heat sources, and/or multi-bay arrangements, discussed further below, will be apparent to those of skill in the art. Referring to FIGS. 1-5, the method for delivering heat for cooking food via the vertical grilling apparatus includes, at step 200, aggregating a plurality of food items 136 in a food cartridge 130, in which the food cartridge 130 has a pair of opposed hinged sides 132 and food inserts 137 (discussed further below) operable to engage a particular type of food item 136. This includes aggregating food items 136 in one or more of a plurality of food cartridges 130, as depicted at step 201, such that at least one of the opposed sides 132 of the food cartridge 130 includes food specific inserts 137, the food specific inserts 137 having a shape corresponding to a particular type of food item 136 and operable to secure the particular type of food item 136 between the opposed sides 132, as disclosed at step 202.

A user, or cook, engages handles 134 on the food cartridge 130, in which the handles 134 extend from each of the opposed sides 132 and are operable for locking engagement for securing the food items between the opposed sides using a clasp or clamp 135, as shown at step 203. The clamp 135 is typically a spring biased member with an opening slightly smaller than the width of the handle 134 such that the spring bias causes the clamp to grip both handles 134, thereby securing the handles and the attached sides 132 in a parallel orientation around the food items 136. In the disclosed configuration, the food cartridge 130 has one or more hinges 139, such that the hinges 139 couple the opposed sides 132, in which each opposed side 132 has a handle 134 operable to clamp to the handle 134 of the opposed side 132 for engaging the food items 136 between the opposed sides 132, as shown at step 204.

The user or operator rotates the loaded food cartridge 130 such that the opposed sides are disposed vertically 132 with respect to each other, therefore aligned with the slot 101 in the door 162 of the housing 100, as depicted at step 205. At step 206, the user inserts the food cartridge 130 into a vertical slot 101 in a housing 100 having the rails 120, such that the rail pairs 120 are adapted to engage the food cartridge 130 in a vertical manner between a plurality of thermal elements 110. The disclosed configuration employs two "H" shaped heating elements on either side of the rack 130, however alternate configurations of thermal elements may be anticipated. For example, a portable arrangement employing electric thermal elements avoids the need for a fixed gas supply line. In the configuration shown, the user inserts the food cartridges 130 in a plurality of respective rails 120 accessible via the vertical slot 101, the plurality of rails 120 being disposed corresponding to the vertical orientation of the vertical slot 101 and operable for simultaneous engagement with a respective food cartridge 130, as shown at step 207. Therefore, a number of rail pairs 120 may be located in the housing 100, one on top of the other, such that they are accessible via the same slot 101. In alternate arrangements, the housing 100 may further include a plurality of cooking bays 100'-1 ... 100'-4 (100' generally), shown below in FIG. 8, such that each cooking bay 100' has first and second thermal elements 110 and a set of rail pairs 120, in which the cooking bays 100' are disposed adjacently and share a common heat source, as depicted at step 208.

As shown in FIG. 2, the rails (rail pairs) 120 each include a parallel elongated bottom member 124 and an elongated top member 122, in which the bottom member 124 has a base surface 125 and opposed lateral side surfaces 126. Similarly, the elongated top member 122 has a top surface 123 and opposed lateral side surfaces 126, such that the base surface 125 is for engaging a side of the food cartridge 130 and the lateral side surfaces 126 are for preventing lateral movement of the food cartridge 130, as shown at step 209. Therefore, the plurality of rails includes sets of rail pairs 120, in which each rail pair 120 includes the bottom member 124 and the top member 122, such that each of the rail pairs 120 are aligned vertically in a collinear manner equidistant between the first 110-1 and second thermal elements 110-2, as depicted at step 210. Subject to housing 100 size, any number of rail pairs 120 may be disposed in the housing 100 to receive various food cartridges 130. In the particular configuration shown, two rail pairs 120-1, 120-2 are shown, each adapted to receive a particular size food cartridge 130. The sets of rail pairs 120 therefore have an upper rail pair 120-1 and a lower rail pair 120-2, such that the upper rail pair 120-1 has a larger vertical distance between the elongated top 122 and bottom 124 members than the lower rail pair 120-2, and is adapted to engage food cartridges 130 of a different size than food cartridges corresponding to the lower rail pair 120-2, as depicted at step 211. Each rail pair 120 corresponds to a width of the food cartridge 130 it may engage (accept) defined by the distance between the respective top 122 and bottom 124 rails. In the example configuration, a top rail pair 120-1 has a greater distance between the rails 122, 124 and is sized for a larger food cartridge 130, such as a six patty cartridge, discussed further below. A shorter rail pair 120-2 is designed to receive a smaller two patty food cartridge 130.

In the case of a multi-bay 100' arrangement, the food cartridge 130 loading and inserting is repeated for each respective bay 100', thus control reverts to step 200 until each bay 100' is populated, as shown at step 212. Once the housing 100 is loaded, the thermal elements 110 are activated (ignited or energized), such that the thermal elements 110 on opposed sides of the rails 120 provide thermal communication from the thermal elements 110 to both opposed sides 132 of the food cartridge 130 and food items 136 therein, as depicted at step 213, thus cooking both sides of the food items 136 simultaneously. The first 110-1 and second thermal elements 110-2 therefore define a heating current 152, the rails 120 disposed within the heating current 152, such that the heating current passes upwards through the finishing rack 140 for providing the thermal communication to the finishing rack 140, as shown at step 214. Thus, the finishing rack 140 is in the same thermal path 150 as the rails 120, and may be employed as a warming rack for maintaining food or to augment the cooking process and achieve a "well done" state of the food items 136.

The thermal elements 110 further comprise elongated, coplanar radiating fingers 114, such that the elongated radiating fingers 114 are parallel and connected by a central member 116 for providing a heat source to the fingers 114, as depicted at step 215. The example heat source is a gas based fuel, however electric or other liquid filled members may be employed, depending on the needs of the particular installation. As indicated above, an electric heat source is particularly amenable for a non-commercial (home) installation where the thermal elements 110 operate on ordinary household current (120 v, 60 Hz) to lend portability to the vertical grilling apparatus.

The food cartridge 130 disposes the food items in a vertical adjacency, in which the vertical adjacency is such that cooking fluids emanating from the food items 136 drips onto other food items 136 before falling into a drip trap 109, as shown at step 216. Grilled food is desirable because of the manner in which fluids in the food, such as meat juices, flow during the cooking process. By dripping down over other food items, dryness is prevented without trapping excess moisture or fatty substances in the finished food item 136. The housing 100 therefore further comprises a drip trap 109, in which the bottom 106 of the housing 100 has a drip opening 108 for fluid communication to the drip trap 109, and the drip trap 109 has a conduit coupling 111 to a drip trap 109 of adjacent cooking bays 100', such that the conduit 111 is responsive to a common drip collector 105, as shown at step 217. In the multi-bay 100' arrangement, therefore, each bay 100' drains into the common drip collector 105, simplifying maintenance and clean-up.

About halfway through a grilling cycle, the user removes the food cartridge 130 from the housing 100, as depicted at step 218. The user then rotates the food cartridge 130 to reverse the orientation of the opposed sides 132, such that the rotating is operable to dispose food items 136 on a lower side of the food cartridge 130 to be disposed on an upper side of the food cartridge 130, since the upper side of the food cartridge is at a higher position in the thermal stream 152 than the lower side, as depicted at step 219. Due to the nature of heat to rise in the heating current 152, food items 130 in the upper part of the housing 100 may receive more heat than the lower part. Rotating the cartridge 130 midway through cooking mitigates this differential.

Upon completion of the cooking cycle, the user may place the food cartridge on the finishing rack 140 on top of the housing 100, in which the finishing rack 140 disposes the food item 136 in the same thermal current 152 defined by the thermal elements 110 for cooking in the housing 100, as depicted at step 220. The finishing rack may be employed for a variety of purposes, such as warming, augmenting doneness, and allowing the cooked food to drain back to the drip trap 109.

Figure 6A:
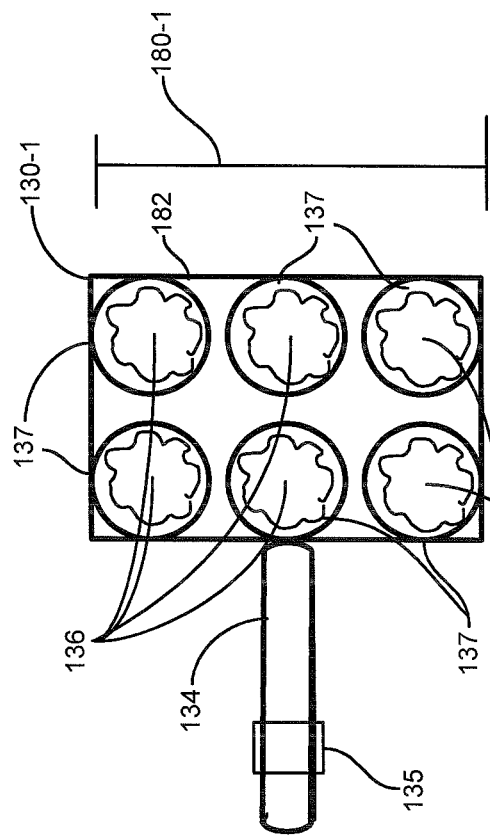
FIGS. 6a and 6b are plan views of a food cartridge suitable for use with the vertical grilling apparatus of FIGS. 1 and 2.
Figure 6B:
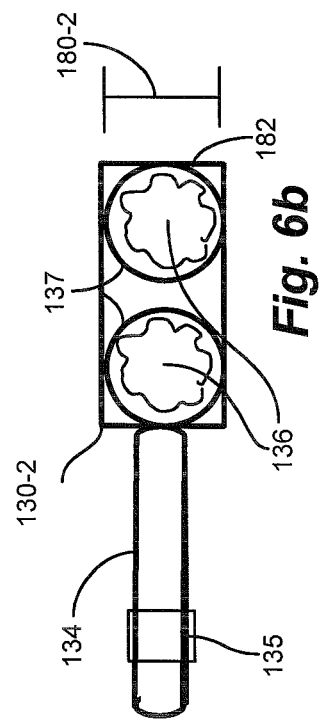

FIGS. 6a and 6b are plan views of a food cartridge suitable for use with the vertical grilling apparatus of FIGS. 1 and 2. Referring to FIGS. 1 and 6a-6b, the food cartridges 130 may be fabricated in a variety of sizes to correspond to the distance between the rails 122, 124 of the rail pair 120 designed to receive the food cartridge 130. A side 182 opposite the handle 134 defines a width 180-1, 180-2 (180, generally) corresponding to the distance between the rails 122, 124 of the rail pair 120 to receive the food cartridge 130. Each food cartridge 130 may also include food specific inserts 137, such as adapted for beef patties, chicken, fish, sausage, or any suitable shape of a food item 136. In the example shown, the food cartridge 130-1 in FIG. 6a has a width 180-1 corresponding to the larger rail pair 120-1, and has a food insert 137 for six burgers. In contrast, the smaller food cartridge 130-2 in FIG. 6b has a width 180-2 corresponding to the smaller rail pair 120-2, and has a food insert 137 for two burgers.

Figure 7:
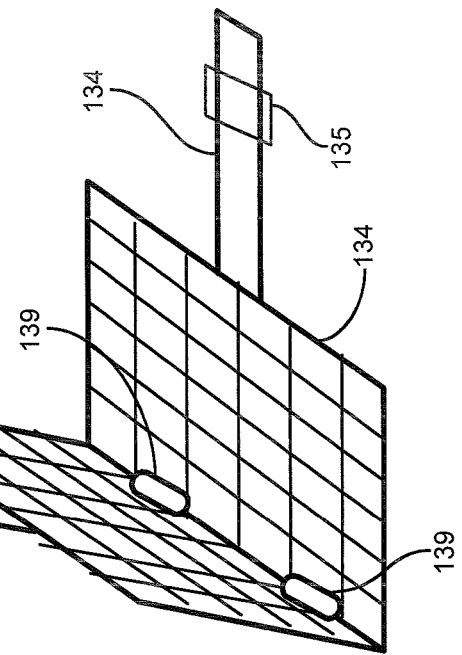

FIG. 7 is a perspective view of a food cartridge as in FIG. 6a. Each of the sides 132 attaches via a set of hinges 139 such that the hinges 139 allow the sides 132 to close in an opposed manner around the food items 136, thereby retaining the food therebetween.

Figure 8:
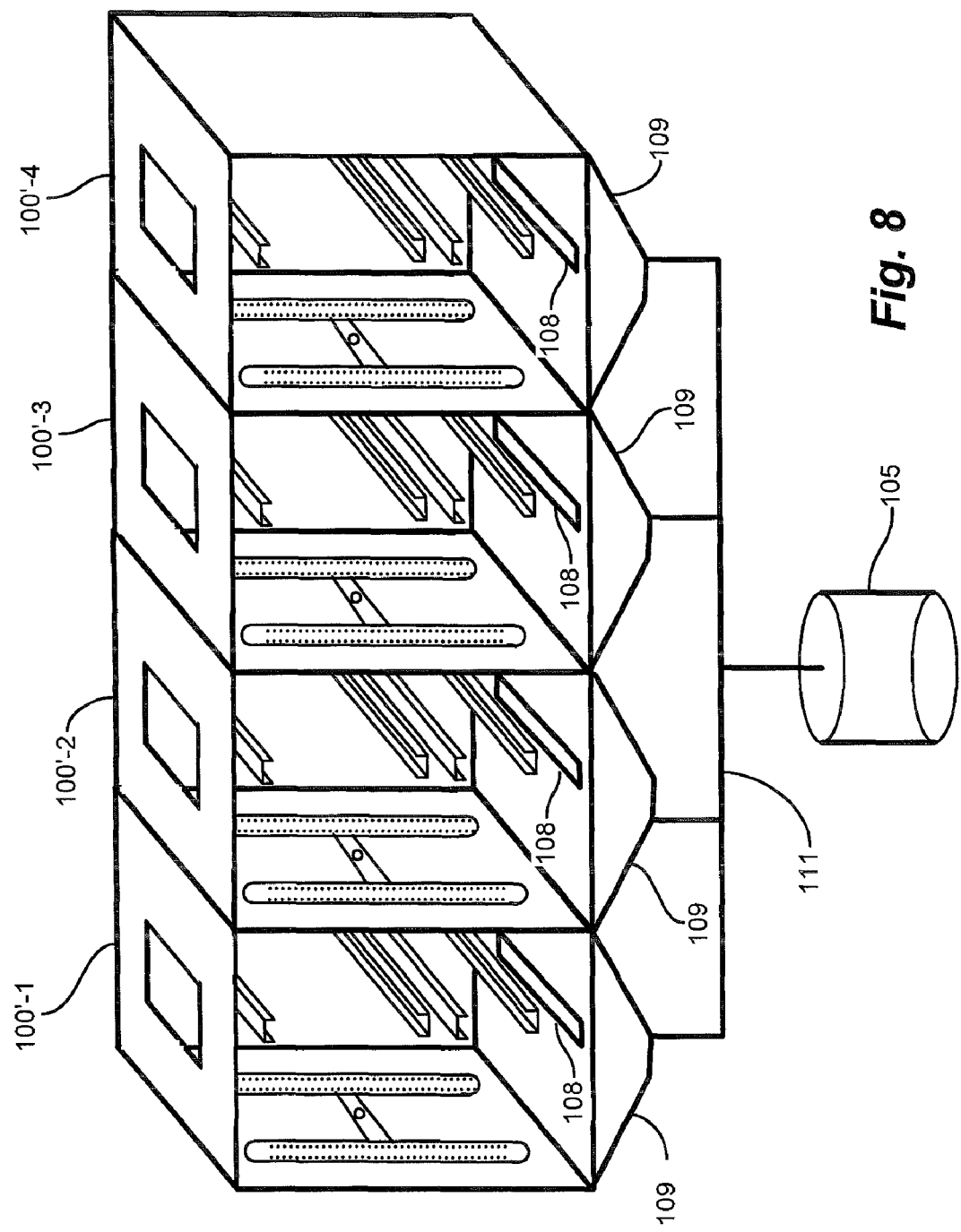
FIG. 8 is a perspective view of a multi-bay vertical grilling apparatus.

FIG. 8 is a perspective view of a multi-bay vertical grilling apparatus. Referring to FIGS. 1, 2 and 8, FIG. 8 shows a plurality of bays 100'-1 ... 100'-4 (100' generally). Each of the bays 100' is similar to the housing 100, and shares a common heat source and drip conduit 111 leading to a common drip collector 105. The multi-bay 100' arrangement provides volume scalability depending on the particular installation, and allows each of the bays to be supplied from a common heat source or manifold, as well as ventilation (hood 160) arrangements and drip trap 109 handling.

Figure 9:
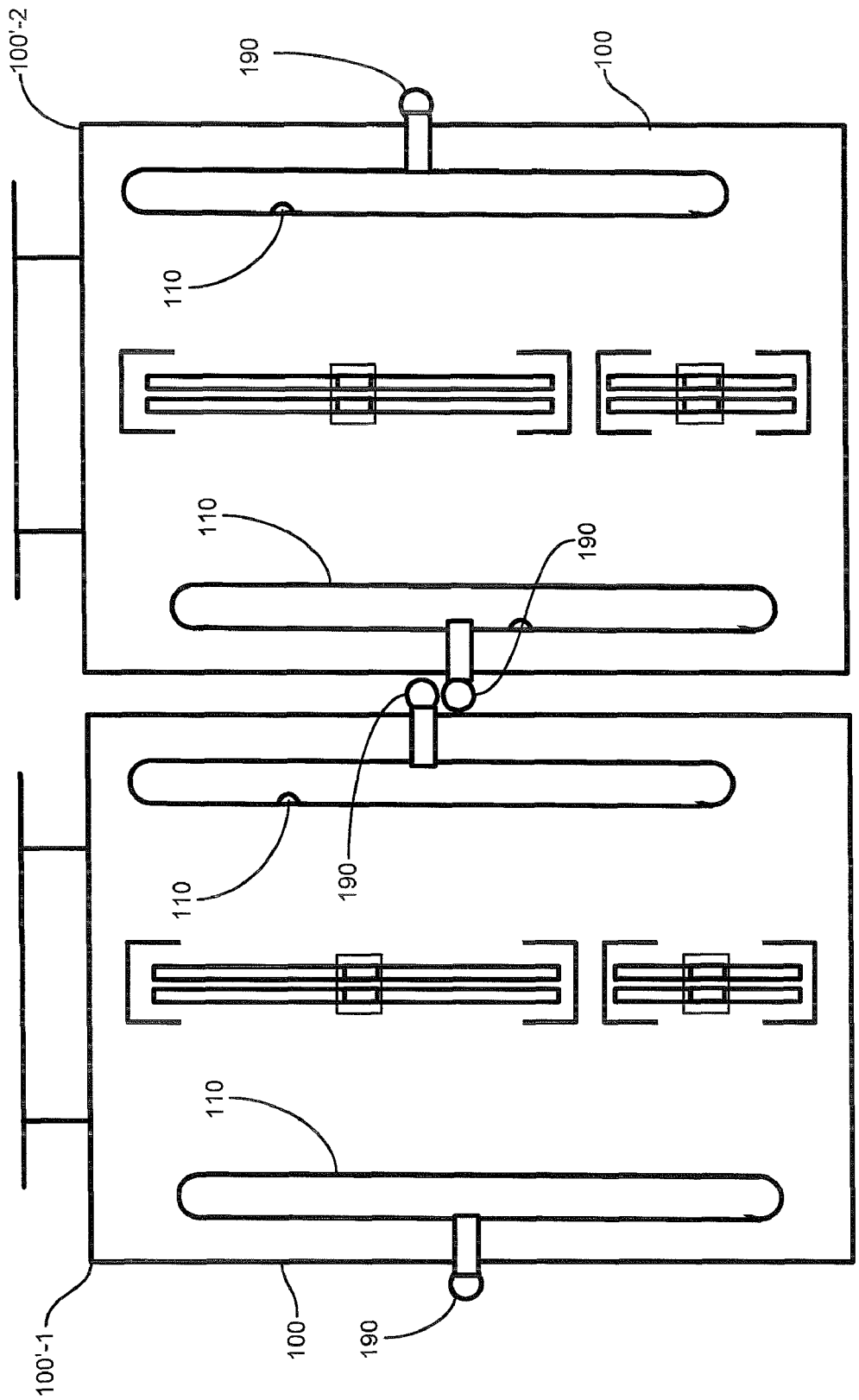
FIG. 9 shows a fuel delivery configuration of a multi-bay grilling apparatus of FIG. 6.

FIG. 9 shows a fuel delivery configuration of a multi-bay grilling apparatus of FIG. 6. In the multi-bay 100' arrangement, each adjacent bay 100' has thermal elements 110 attached to the side of the housing 100 facing the adjacent bay 100'. Accordingly, a fuel source delivery 190 such as a gas pipe supplied each of the thermal elements 110. The thermal elements 110 are displaced upwards or downwards from the thermal element in the adjacent bay 100' such that the fuel source delivery 110 does not impede the fuel source delivery 110 of the adjacent bay. In other words, each of the pipes is allows to run one over the other, rather than side by side, due to the vertical offset. Otherwise, additional space constraints might hinder a side by side arrangement.

Figure 10:
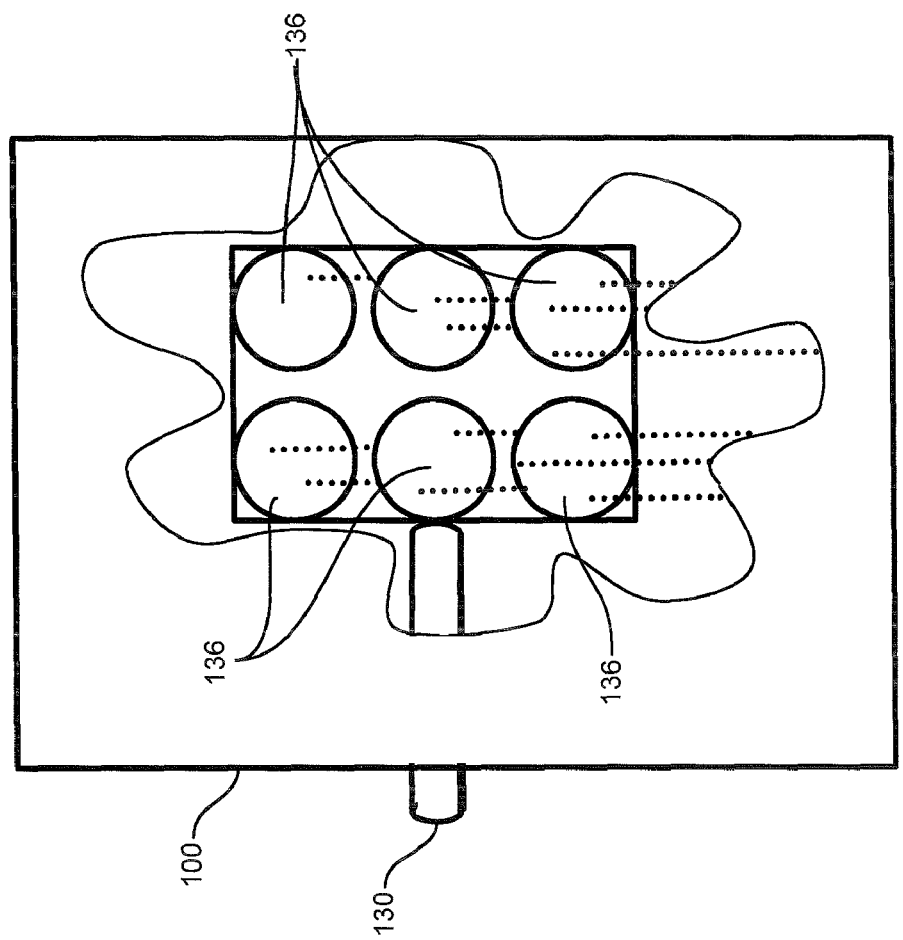
FIG. 10 shows a cutaway side view of food items cooking in the vertical grilling apparatus.

FIG. 10 shows a cutaway side view of food items cooking in the vertical grilling apparatus. As indicated above, cooking fluids emanating from the food items 136 is a particular aspect of grilling. The vertical orientation provided by the food cartridge 130 allows the food items 136 above to emanate (drip) on the food items 136 below. Upon inverting the food cartridge 130 midway, the fluid flow is reversed, such that the former top food items 136 are disposed on the bottom where they may receive cooking fluids from the food items 136 above.

While the apparatus and method for vertical grilling has been particularly shown and described with references to embodiments thereof, it will be understood by those skilled in the art that various changes in form and details may be made therein without departing from the scope of the invention encompassed by the appended claims.

What is claimed is:

1. A cooking apparatus comprising:
   a housing having a top, a bottom and at least one side, the housing defining a vertical slot, the vertical slot receptive to a plurality of food cartridges operable to contain food items;
   a first thermal element and a second thermal element, the first and second thermal elements disposed within the housing on opposed sides of the slot;
   a plurality of pairs of rails disposed within the housing, wherein each rail in the plurality of pairs of rails extends from the vertical slot along a respective longitudinal rail axis that is perpendicular to the force of gravity, each respective longitudinal rail axis of each respective rail being parallel to each other, the plurality of pairs of rails being vertically stacked such that an alignment line that is parallel to the force of gravity passes perpendicularly through each respective longitudinal rail axis, each pair of rails operable to receive a respective one of the plurality of food cartridges via the vertical slot; and
   a finishing rack disposed above an opening in the top of the housing, the finishing rack in thermal communication with the first and second heating elements.

2. The apparatus of claim 1 wherein each pair of rails includes a bottom member and a top member, the bottom member having a base surface and opposed lateral side surfaces, the top member having a top surface and opposed lateral side surfaces, the base surface for engaging a side of the respective one of the plurality of food cartridges and the lateral side surfaces for preventing lateral movement of the respective one of the plurality of food cartridges.

3. The apparatus of claim 2 wherein the plurality of pairs of rails further comprises each of the rail pairs aligned vertically in a collinear manner equidistant between the first and second thermal elements.

4. The apparatus of claim 3 wherein the plurality of pairs of rails further comprises an upper rail pair and a lower rail pair, the upper rail pair having a larger vertical distance between the top and bottom members than the lower rail pair and adapted to engage the respective one of the plurality of food cartridges, the respective one of the plurality of food cartridges being a different size than a second respective one of the plurality of food cartridges corresponding to the lower rail pair.

5. The apparatus of claim 1 wherein the first and second thermal elements define a heating current, the plurality of pairs of rails disposed within the heating current, the heating current passing upwards through the finishing rack for providing the thermal communication to the finishing rack.

6. The apparatus of claim 5 wherein the thermal elements are electric resistance heating elements responsive to a household AC (alternating current) heat source.

7. The apparatus of claim 5 wherein the thermal elements further comprise elongated, coplanar radiating fingers, the elongated radiating fingers being parallel and connected by a central member for providing a heat source to the fingers, wherein the housing further comprises a plurality of cooking bays, each cooking bay having first and second thermal elements and a set of rail pairs, the cooking bays disposed adjacently and sharing a common heat source;

wherein the thermal elements are responsive to a gas heat source, the first thermal element disposed at a vertical offset with respect to the second thermal elements, the vertical offset corresponding to a diameter of a heat source supply for an adjacent cooking bay.

8. The apparatus of claim 7 wherein the housing further comprises a drip trap, the bottom of the housing having a drip opening for fluid communication to the drip trap, the drip trap having a conduit coupling to a drip trap of adjacent cooking bays, the conduit responsive to a common drip collector, wherein the food cartridge disposes food items in a vertical adjacency, the vertical adjacency such that cooking fluids emanating from the food items drips onto other food items before falling into a drip trap.

9. The apparatus of claim 5 wherein the respective one of the plurality of food cartridges further comprises a hinge, the hinge coupling opposed sides, each opposed side having a handle operable to clamp to the handle of the opposed side for engaging the food items between the opposed sides, wherein at least one of the opposed sides of the food cartridge includes food specific inserts, the food specific inserts having a shape corresponding to a particular type of food item and operable to secure the particular type of food item between the opposed sides.

10. The apparatus of claim 1 wherein the plurality of food cartridges are adapted for sliding communication with the plurality of pairs of rails for disposing each respective food cartridge of the plurality of food cartridges in thermal communication with the thermal elements, each respective food cartridge operable for sliding engagement with a corresponding pair of rails from the plurality of pairs of rails, the sliding engagement disposing each respective food cartridge between the first and second thermal elements for applying heat to food items therewithin.

11. The apparatus of claim 10 further comprising a monitoring portal in the housing, the monitoring portal defined by a cutaway of the housing, the cutaway adapted for ventilation of the housing and observation of the foot items in the plurality of food cartridges.

12. The apparatus as in claim 1,
wherein the plurality of pairs of rails are disposed within the vertical slot.

13. The apparatus as in claim 12, comprising:
wherein the at least one set of vertically aligned rails is disposed beneath the opening in the top of the housing.

* * * * *